United States Patent [19]

Dodds

[11] 4,132,026

[45] Jan. 2, 1979

[54] SIMPLIFIED BLANK FORMING A RODENT POISON CONTAINER

[75] Inventor: Rand E. Dodds, Portage, Mich.

[73] Assignee: J. J. Dill Company, Kalamazoo, Mich.

[21] Appl. No.: 790,237

[22] Filed: Apr. 25, 1977

[51] Int. Cl.² ............................................. A01M 1/20
[52] U.S. Cl. .................................................... 43/131
[58] Field of Search ................ 43/131, 121; 229/37 E

[56] References Cited

U.S. PATENT DOCUMENTS

| 2,359,341 | 10/1944 | Weil | 43/131 |
|---|---|---|---|
| 2,587,397 | 2/1952 | Smith | 43/131 |
| 2,964,871 | 12/1960 | Hoffman | 43/131 |
| 3,343,744 | 9/1967 | Morell et al. | 43/131 X |
| 3,517,454 | 6/1970 | Query | 43/131 |
| 3,750,326 | 8/1973 | Haubtmann | 43/131 |

FOREIGN PATENT DOCUMENTS

| 1402847 | 5/1965 | France | 43/131 |
|---|---|---|---|
| 86658 | 2/1966 | France | 43/131 |
| 1463757 | 12/1966 | France | 43/131 |

*Primary Examiner*—Ronald E. Suter
*Attorney, Agent, or Firm*—Blanchard, Flynn, Thiel, Boutell & Tanis

[57] ABSTRACT

Rodent controlling device wherein rodents, such as rats, are directed to a zone where a poisoning agent has been placed. The device embodying the invention is made from a single stamping of suitably stiff but bendable material, such as sheet metal, sheet plastic or paperboard, same is bent to form a tube, preferably one of rectangular cross section and held by suitable tabs inserted in corresponding slots. Rodent poison is placed within said tube. Further tabs form a low wall across each end of the tube which both rigidify the tube and assist in holding the poison within the tube. Holes are placed if desired through an upper portion of the tube to facilitate inserting the poison therein. The tubes are placed in a known runway of rodents in question and same are poisoned as they pass through the tubes in endeavoring to follow their habitual runways.

3 Claims, 5 Drawing Figures

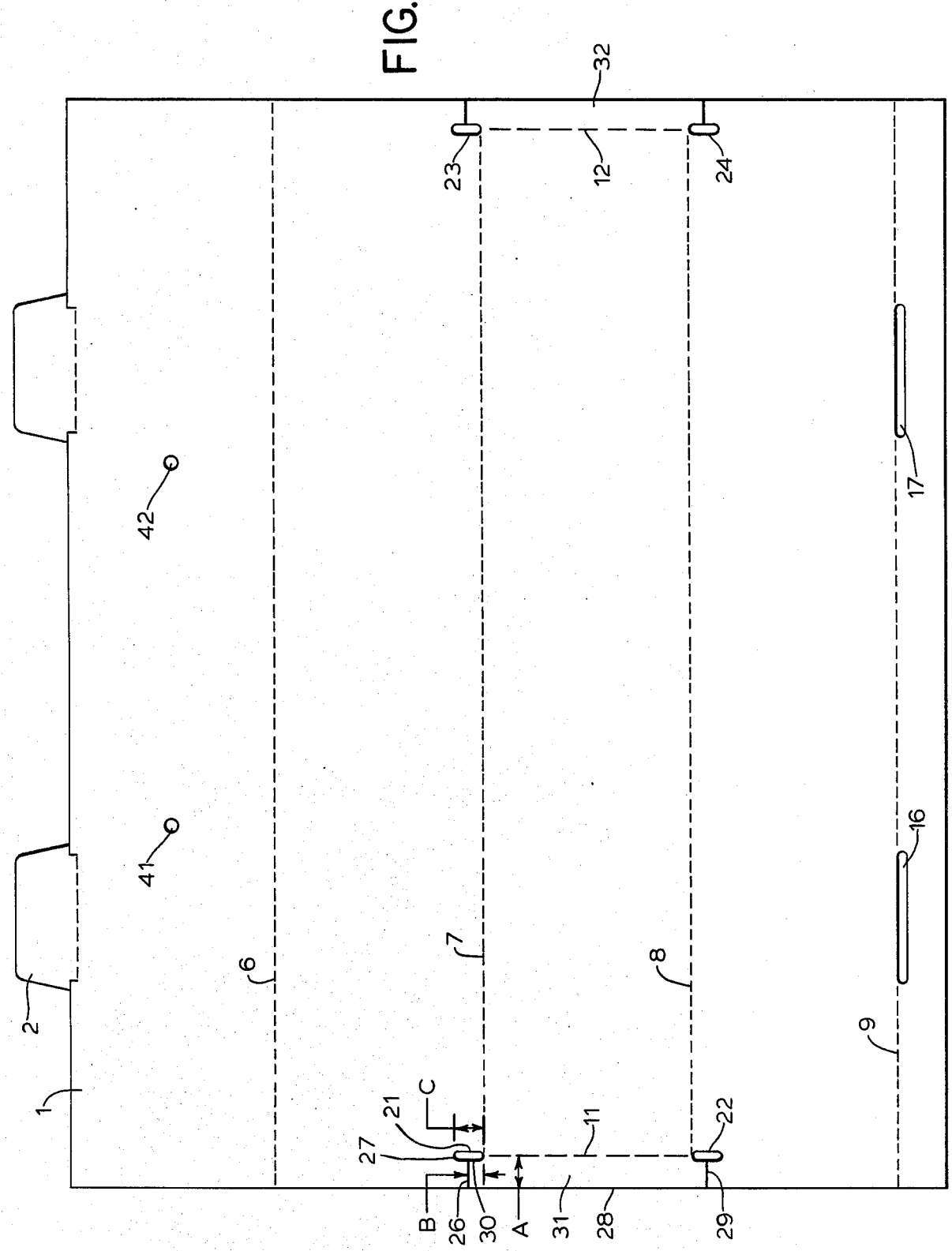

SIMPLIFIED BLANK FORMING A RODENT POISON CONTAINER

FIELD OF THE INVENTION

The invention relates to a rodent control or exterminating device and particularly to one which can be made extremely inexpensively from paperboard or similar material by simple stamping and folding steps and which may then be placed in a rodent runway to guide the rodent into contact with an appropriate poisoning material as said rodent endeavors to follow such runway.

BACKGROUND OF THE INVENTION

The problem of exterminating, or at least controlling, the population of pests, particularly rodents such as rats and mice, is an extremely old problem and has been dealt with in innumerable ways. Many of these ways are well known to the average householder and to the average owner and/or maintenance personnel of commercial etablishments. Some are extremely simple and others very sophisticated but they are all insofar as I am aware subject to various problems and difficulties.

For example, most trapping devices have the advantage of providing a definite action but the disadvantage of having to be emptied periodically and some disposition made of the dead body caught therein. Where rodent population is high, this obviously limits the number of animals that can be disposed of at a given time by a single trap device and thus requires either frequent emptying or acceptance of low performance.

Partly to meet this problem and partly to provide a higher level of convenience in the elimination of rodents and/or other similar pests, various kinds of poisons have been offered to the trade. These require ingestion by the rodent and hence various techniques have been employed for inducing such ingestion. In some cases the poison is provided with an attractive taste but this often attracts other than the desired animals for poisoning, namely such as dogs and/or cats which may be permitted to roam in the same general area.

Accordingly, the objects of the invention include:

1. To provide a device for containing an ingestable poison for rodents and/or other pests and for facilitating the ingestion thereof by such pests.
2. To provide a device, as aforesaid, into which such poison can be placed, and which will resist scattering thereof by the rodent.
3. To provide a device, as aforesaid, which will have a high level of versatility and can accordingly be placed in a wide variety of operating situations.
4. To provide a device, as aforesaid, which can be conveniently positioned in known rodent runways.
5. To provide a device, as aforesaid, which can be constructed in a simple manner from simple materials.
6. To provide a device, as aforesaid, which can readily be made in a number of different sizes.
7. To provide a device, as aforesaid, which can be made of simple and inexpensive materials but which will function effectively over a long period of time.
8. To provide a device, as aforesaid, which will be of sufficiently inexpensive construction as to be capable of manufacturing in large numbers with only a low manufacturing and maintenance cost.
9. To provide a device, as aforesaid, which can be made by a single punching action from a sheet of relatively stiff but bendable material, such as paperboard, sheet metal or sheet plastic, and which may then be assembled into an operating manner quickly and by relatively simple bending of component parts.

Other objects and purposes of the invention will be apparent to persons acquainted with devices of this general type upon reading the following specification and inspection of the accompanying drawings.

BRIEF DESCRIPTION OF THE DRAWINGS

In the drawings:

FIG. 5 is a plan view of the blank from which the device of the invention is assembled.

SUMMARY OF THE INVENTION

Figure 1:
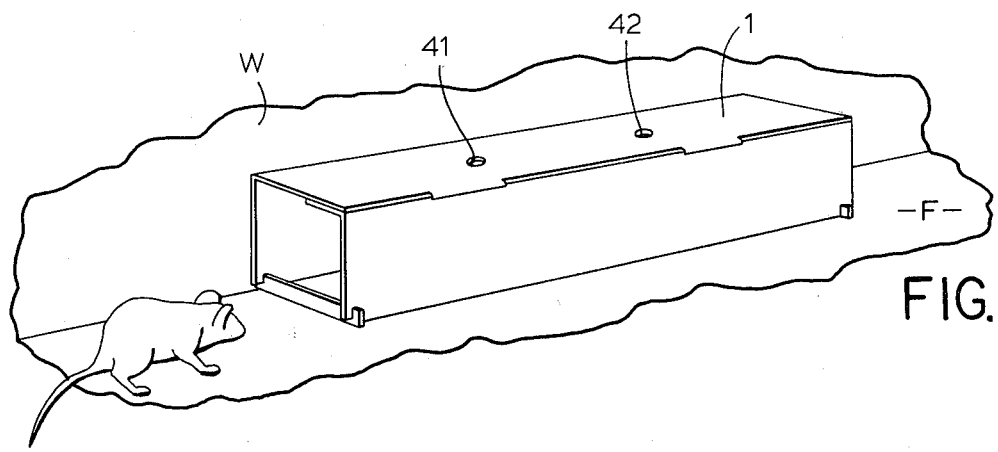
FIG. 1 is an oblique view of the device of the invention in its normal position of operation.
Figure 2:
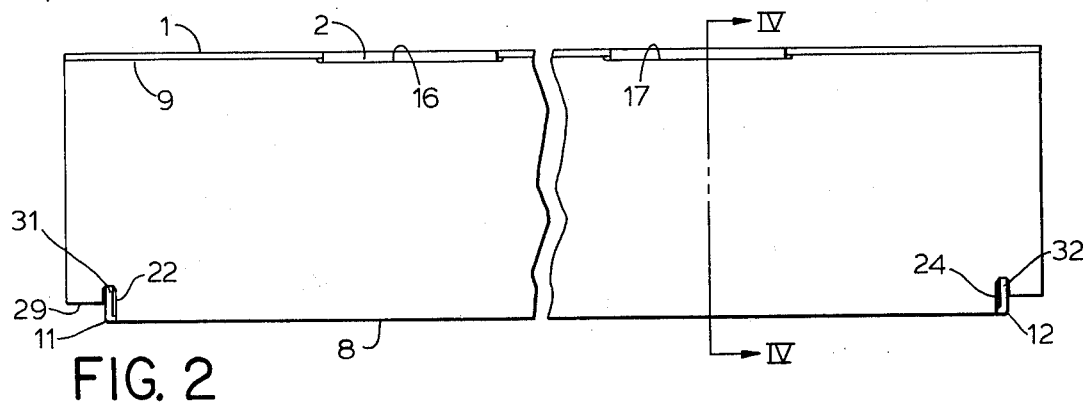
FIG. 2 is a broken side view of a device embodying the invention.
Figure 3:
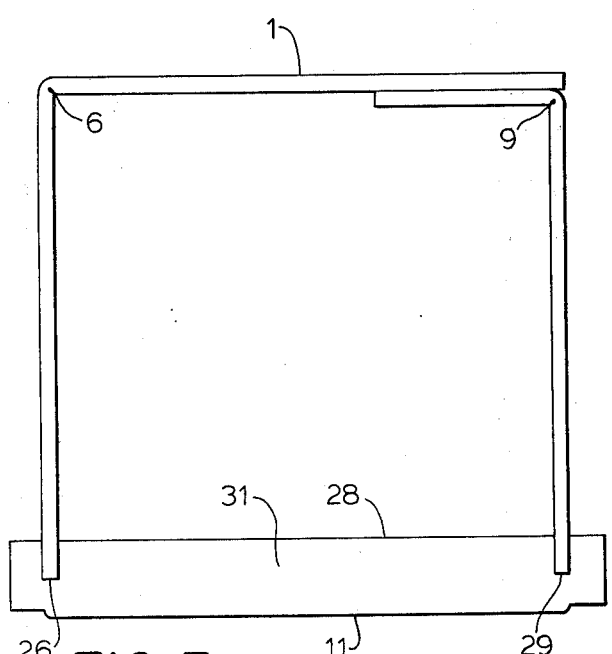
FIG. 3 is an end view of a device embodying the invention.
Figure 4:
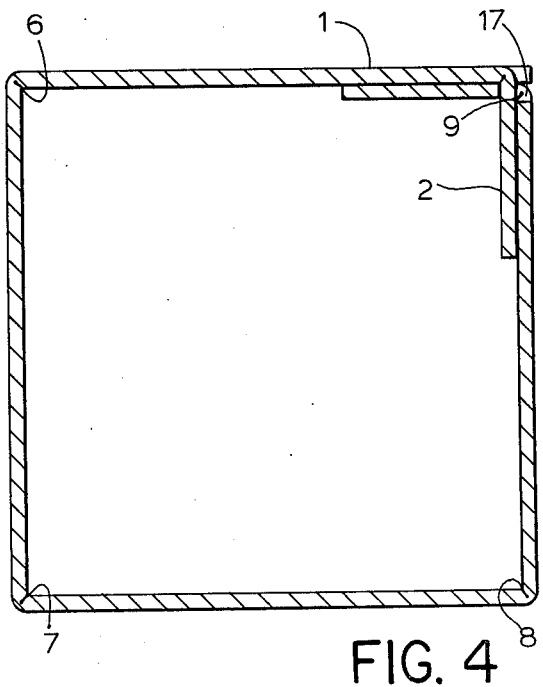
FIG. 4 is a sectional view taken on the line IV-IV of FIG. 2.

Looking first at FIG. 1 it will be seen that there is formed a rectangular tube which may be placed in the path of a rodent's, as a rat's, normal runway and a suitable poison placed therein. The rat then in following his normal runway will tend to pass through said tube, contact such poison and then move on. By the time the poison has become effective, the rat is beyond said tube and therefore does not block or inhibit its subsequent functioning with respect to further rats.

DETAILED DESCRIPTION

In carrying out the invention, there is provided a blank from which the tubular device may be constructed by a simple folding, tab inserting and related manipulations. Looking first at FIG. 5 there is shown a sheet of any reasonably stiff but bendable material, as paper-board, sheet metal or sheet plastic. Said sheet may be cut by a single stroke of a single die and includes a generally rectangular body 1 having along one side thereof a pair of projecting tabs 2 and 3. Fold lines 4 and 6 are provided at the bases of said tabs. Further fold lines are provided longitudinally of the body 1 at 6, 7, 8 and 9. Still further fold lines from purposes appearing hereinafter are provided at 11 and 12. Slots for the reception of tabs 2 and 3 are provided at 16 and 17 adjacent the fold line 9. Further slots are provided at 21, 22, 23 and 24 for purposes further appearing hereinafter and each is provided with a tab cut identical with and sufficiently illustrated by the tab cut (or narrow slot) 26 associated with slot 21. The tab cut 26 connects with slot 21 at a point intermediate (here halfway between) its ends and divides slot 21 into a retention portion 27 and a tab defining portion 30. The dimension A from the fold line 11 to the adjacent parallel edge 28 of the blank is greater than the dimension B comprising the length of portion 30 of slot 21 and not greater than the dimension C comprising the total length of the slot 27. The tab cut 26 is here shown as a mere cut but it may be a narrow slot if desired to facilitate assembly of the device.

Slot 22 and tab cut 29 are identical with slot 21 and tab cut 26 and define the other end of tab 31. Body 1 is provided with a further tab 32 defined by the slots 23 and 24, associated tab cuts, and fold line 12, all of which are mirror images of the slots 21 and 22, tab cuts 26 and 29 and fold line 11 defining the tab 31.

Fold lines 7 and 8 are substantially adjacent to (preferably intersect) the adjacent ends of the slots 21 and 22 and the fold line 11 extends between said slots. Fold lines 7, 8 and 12 are similarly placed with respect to slots 23 and 24.

With the blank cut as thus far described, same is folded through 90° at each of the fold lines 6, 7, 8 and 9 to form the tubular shape shown in FIG. 1. The tabs 2 and 3 are then inserted into the slots 16 and 17 to hold same in such position. The tabs 31 and 32 are then bent upwardly and inserted into the retention portions of the slots 21, 22, 23 and 24, namely the portions corresponding to the retention portion 27 of slot 21. The length of the slots 21-24 provide sufficient clearance to enable the tabs 31 and 32 to be bent and inserted into said retention portions without undue distortion of such tabs. When said tab 31 is in position, it will provide an appearance as shown in FIG. 1 and the tab 32 at the opposite end of the device presents a similar appearance.

With the device placed along a runway, such as along the wall W of FIG. 1, the tabs 31 and 32 are adjacent the floor F and provide not only stiffening for the entire structure comprising the poison dispensing device but provide a low barrier at each end which will not appreciably obstruct passage of the rodent therethrough but which will assist in retaining within the device any powder which may be placed therein.

Preferably openings 41 and 42 ar provided in the top of the finished device for the convenient insertion of powder thereinto. Same may be inserted in any convenient manner such as by a spoon and funnel or same may be inserted by any other of many well-known powder handling means.

Since the device is relatively small, it will be difficult or impossible for a domestic pet such as a dog or a cat to obtain any poison which may be placed therein and hence the device may be safely used in the presence of domestic pets.

Many kinds of poisons may be used with the device of the invention. As indicated, the poison may be a powder inserted in any convenient manner such as through the openings 41 and 42, or where said openings are not provided through the open ends of the device 1, and it may be of the type which the animal eats directly and is thereby poisoned or it may be of the type which the animal gets on its feet and fur and later ingests by licking its feet and fur for grooming purposes. Still further, the poison may be placed in small containers within the device for eating or licking by the animal as he passes therethrough It will be appreciated that the device of the invention is extremely simple, it is very inexpensive to make and yet can be used with a wide range of poisons as desired according to particular circumstances and same may be used with a minimum of risk to any domestic pets which may be present provided only such pets are of size somewhat larger than the pests which are to be eliminated.

While a particular embodiment of the invention has been chosen for illustrative purposes, it will be apparent that a variety of modifications may be made in the specific form here illustrated within the scope of the invention and accordingly said modifications will be within the scope of the hereinafter appended claims excepting as said claims by their own terms expressly limit otherwise.

The embodiments of the invention in which an exclusive property or privilege is claimed are defined as follows:

1. In a device positionable in a runway for exposing pests to a poisonous material, comprising:
    a horizontally elongated tubular member of rectangular cross section, said tubular member including opposed top and bottom walls joined together by opposed side walls;
    said tubular member being formed from a single, substantially rectangular sheet of bendable material;
    one of said side walls and one of said top and bottom walls, adjacent the opposite side edges of the sheet, having cooperating slot and tab means for interlocking said walls together to hold said sheet in a bent for wherein it defines said tubular member;
    a low upright barrier wall fixed to said tubular member adjacent each end thereof, said low barrier wall being substantially rectangular and extending across the complete width of said tubular member, the opposite ends of said tubular member being substantially open except for said low barrier walls to thereby form a substantially closed tray for retaining poisonous material;
    said barrier wall being integral with said bottom wall and bent upwardly therefrom in substantially perpendicular relationship thereto, said bottom wall having a horizontal longitudinal length which is less than the horizontal longitudinal length of the adjacent side walls, said bottom wall having its end edges spaced inwardly from the adjacent end edges of the side walls by a distance equal to the height of said barrier wall;
    said barrier wall having a horizontal width which is greater than the width of said bottom wall, said barrier wall having integral locking tabs projecting outwardly from the opposite ends thereof, said tabs projecting sidewardly of said tubular member outwardly beyond said side walls; and
    said side walls, adjacent the lower corners thereof, having cut means for receiving therein one of said locking tabs to interlock the barrier wall to said side walls and rigidify said tubular member.

2. The device of claim 1, including opening means formed in said top wall, said opening means being of a size to facilitate the insertion of a poisonous material into said tubular member.

3. The device of claim 1, wherein said sheet, prior to being formed into said tubular member, is defined by straight parallel end edges joined together by straight parallel side edges which extend perpendicular to said end edges, all of said end and side edges being free of interruptions except for one of said side edges which has said tab means projecting outwardly therefrom.

* * * * *